(12) United States Patent
Youssefzadeh et al.

(10) Patent No.: US 6,198,921 B1
(45) Date of Patent: Mar. 6, 2001

(54) METHOD AND SYSTEM FOR PROVIDING RURAL SUBSCRIBER TELEPHONY SERVICE USING AN INTEGRATED SATELLITE/CELL SYSTEM

(76) Inventors: Emil Youssefzadeh, 1580 Via Zurita, Palos Verdes Estates, CA (US) 90274; James R. Luecke, 27632 Pasa Tiemp, Mission Viejo, CA (US) 92692; Robert E. Serafinko, 15482 Ficus St., Chino Hills, CA (US) 91709

( * ) Notice: Subject to any disclaimer, the term of this patent is extended or adjusted under 35 U.S.C. 154(b) by 0 days.

(21) Appl. No.: 09/192,732

(22) Filed: Nov. 16, 1998

(51) Int. Cl.[7] .......................................... H04Q 7/20
(52) U.S. Cl. ........................ 455/428; 455/427; 455/430
(58) Field of Search .................. 455/12.1, 13.1, 455/13.2, 427, 428, 429, 430; 370/316, 321, 401

(56) References Cited

U.S. PATENT DOCUMENTS

| | | |
|---|---|---|
| 5,280,472 | 1/1994 | Gilhousen et al. . |
| 5,392,450 | 2/1995 | Nossen . |
| 5,544,223 | 8/1996 | Robbins et al. . |
| 5,578,972 | 11/1996 | Hadden et al. . |
| 5,592,481 * | 1/1997 | Wiedeman et al. ................ 455/12.1 |
| 5,614,914 | 3/1997 | Bolgiano et al. . |
| 5,634,190 * | 5/1997 | Wiedeman ........................ 455/13.1 |
| 5,663,990 | 9/1997 | Bolgiano et al. . |
| 5,708,679 | 1/1998 | Fernandes et al. . |
| 5,742,640 | 4/1998 | Haoui et al. . |
| 5,748,610 | 5/1998 | Bustamante et al. . |
| 5,757,784 * | 5/1998 | Liebowitz et al. ................. 370/321 |
| 5,890,062 * | 3/1999 | Courtney et al. .................. 455/428 |
| 5,915,217 * | 6/1999 | Wiedeman et al. ................ 455/427 |
| 5,930,708 * | 7/1999 | Stewart et al. .................... 455/430 |
| 5,991,598 * | 11/1999 | Nawata ............................. 455/429 |
| 6,018,660 * | 1/2000 | Alperovich et al. ............... 455/427 |
| 6,064,881 * | 5/2000 | Shea et al. ........................ 455/427 |
| 6,067,452 * | 5/2000 | Alexander ........................ 455/428 |
| 6,072,786 * | 6/2000 | Wang et al. ...................... 370/324 |
| 6,097,706 * | 8/2000 | Fielding et al. ................... 370/319 |

* cited by examiner

*Primary Examiner*—Dwayne Bost
*Assistant Examiner*—Quang Vu
(74) *Attorney, Agent, or Firm*—Patton Boggs LLP (57) ABSTRACT

An integrated satellite/cell system and equipment that provides low-cost telephony services to remote/rural and other previously non-served areas. Local communications is through wireless cell technology with inter cell communication between cells and between cells and the public switched telephone network supported through existing, non-processing satellites by means of satellite earth terminal stations at the remote sites. A demand assigned multiple access satellite network controlled through a open channel signaling and data provides single-hop, full mesh connectivity. The cell can be any cellular or cordless phone technology.

56 Claims, 3 Drawing Sheets

METHOD AND SYSTEM FOR PROVIDING RURAL SUBSCRIBER TELEPHONY SERVICE USING AN INTEGRATED SATELLITE/CELL SYSTEM

BACKGROUND OF THE INVENTION

1. Field of the Invention

This invention relates to integrated satellite/cell telecommunication systems and more particularly to systems and methods for providing low-cost telephony services to remote rural and other previously non-served subscribers by means of distributed switching networks.

2. Description of the Related Art

There is an increasing demand for telephone (voice, fax and data) communication capability. There are three basic forms of telephone service transmission media: guided, unguided and semi-guided. Guided basically entails "hard wired" systems such as wire cable, fiber optic cable, coaxial cable and the like. These systems, while very secure and durable, are capital intensive to install and maintain. Terrain and distances make these systems economically prohibitive.

Unguided media connect through signals propagated into free space. Satellites and wireless telephone systems use this media. As traffic increases the bandwidth required for this type of telephone communication becomes prohibitive. Finally, semi-guided media, such as microwave, links channeled signals from point to point without physical constraints, but are limited to short distances. Thus, telephony services using this medium exclusively are distance limited.

There are many countries around the world that lack a guided telecommunications infrastructure. These are primarily emerging countries, which have remote or rural areas of low density population requiring subscriber telecommunications capability to provide quality communication services. In these emerging or developing countries, the existing infrastructure is insufficient to satisfy the individual subscriber telecommunications requirement of a large portion of the country, and especially the needs of subscribers in remote/rural towns and villages.

Wireless communication for voice, fax, and data services is the most rapidly developing sector of telecommunications. This is especially true in sparsely and rurally populated developing countries where guided systems are prohibitive. Distributed wireless networks have been developed to connect cells of subscribers and/or a cell to a public switched telephone network. A telephone architecture wherein a portion of the interconnect between an individual subscriber unit and a public switched telephone network is accomplished by radio communication is called a wireless local loop.

Heretofore, there have been three basic techniques that can be used to provide subscriber telephony service: (1) cellular, (2) rural access time division multiple access and (3) satellite. These have been applied both separately and in various combinations (so called hybrid systems). Cellular, both analog and digital, is efficient in providing the subscriber inter-cell service using relatively low-cost subscriber equipment. The low cost effectiveness of this service, however, depends on the existence of a cost effective infrastructure to provide an interconnect to other cells as well as the public switched telephone network.

The rural access microwave and wireless time division multiple access systems work well for intra cell connections of cell subscribers as well as the public switched telephone network if distances are short i.e. less than 100 km. But the capital equipment costs for these systems are very high. Finally, satellite systems provide direct connection of all subscribers to other subscribers, as well as the public switched telephone network, usually by means of very small aperture terminals which are distance insensitive, but like time division multiple access, are relatively expensive for the subscriber. As traffic increases bandwidth demands become excessive.

Hybrid systems offer the possibility of providing low-cost subscriber equipment and low cost connection to the public switched telephone network. Thus, theoretically, cellular could be combined with satellite to provide low-cost subscriber equipment with an efficient interconnect to other cells of distances more than 100 km and the public switched telephone network.

Typical cellular systems have one large switching system separating the cell from the public switched telephone network. This large switching system performs a switch/network control function, and is referred to as a mobile switching center or a mobile telephone switching office. The centralized switch maintains a register of all subscriber locations to effect routing both inter-cell and intra-cell. The location register for a particular cell is a database containing the names, ID's, etc. for all subscribers within that cell. In addition, for cellular systems where one may roam into adjacent networks, a visitor location register is maintained that contains the names, ID's, etc. of visitors to the cellular network. (Visitor location registers are not necessary in fixed based wireless local loops.)

In a traditional hybrid cellular/satellite network, all traffic is routed from a base transceiver system through the satellite to the mobile switching center for both the connection to the public switched telephone network and for intra-cell/inter-cell switching functions. In this architecture, an intra-cell and inter-cell call actually requires a double-hop or two communication traffic circuits between the mobile switching center and the remote cell. Since the greatest drawback to satellite communications for telephony applications is the delay introduced when using geosynchronous satellites, double hop systems will exacerbate this delay, use excessive bandwidth and generally degrade network operations.

Full mesh, single hop systems, on the other hand, constrain the delay to a single hop for good voice performance. In a full mesh system, only a single hop is required for inter-cell calls. If operated in a demand assigned multiple access (DAMA) mode, the amount of satellite bandwidth required for cost effective network operations is greatly reduced. In demand assigned mode, all calls are assigned only when satellite bandwidth is required. A request is made (from a cellsite or gateway) for access to the satellite only when a circuit is required to complete a given voice/fax/data call. This technique greatly reduces the amount of bandwidth required since bandwidth can be treated as a pool of channels, shared by the entire network. If channels are not assigned on-demand, then trunks must be maintained between every cellsite and gateway in the network in order to support a single hop operation. This is an exponential function: one trunk between two sites, three trunks between 3 sites, 6 trunks between 4 sites and so forth. As the number of interconnect sites becomes larger, the amount of bandwidth required becomes unsupportable. Additionally, the number of channels supported at each site grows to where it is cost prohibitive. With state of the art voice compression algorithms and demand assigned techniques, the satellite bandwidth required is minimized reducing network operational costs. Small aperture terminals or very small aperture terminals are used to provide the link between the cell base station and another satellite earth terminal.

It would therefore be desirable to have a system designed to avoid the back haul interconnects i.e. double hops to this large switching system or mobile switching center. If a distributed network could be provided where cellular or cordless phone technology was used at the "cellsite" to provide the lowest cost subscriber equipment and a satellite infrastructure could be used to enable the cell to be placed virtually anywhere, the satellite system could be operated as a "demand assigned multiple access" (DAMA) system communicating traffic with "full mesh" capability, i.e. any subscriber being able to communicate with any subscriber or with the public switched telephone network while requiring only a single "satellite hop" (single full duplex channel). If an intra cell call could be switched locally, it would not require access to satellite bandwidth. The result is a system that minimizes the subscriber equipment cost, minimizes network operational cost, and provides the ability to build and connect cells virtually anywhere while eliminating the need for large switching centers to handle data communications.

Various proposals in the prior art have attempted to solve this rural telephony dilemma in a number of ways, all with only a modicum of success. For example, U.S. Pat. No. 5,280,472 teaches a microcellular telephone system that utilizes satellites in combination with a wireless local loop. A wireless local loop (wireless PBX) system uses a distributed antenna system consisting of a set of simple antennas fed by common signal in order to cover a given area. Time delays are introduced between antennas so that signals received from two antennas are distinguishable.

U.S. Pat. No. 5,742,640 discloses a system which uses wireless access between subscribers and the base station. The base station is connected to the controller by means of a wire line encrypted modem link. The controller provides a physical connection to public switched telephone network. All calls are, by definition, routed to the public switched telephone network for any switching. This system is not appropriate for use with a satellite link between the cell and the public switched telephone network.

U.S. Pat. Nos. 5,748,610, 5,663,990 and 5,614,914 disclose satellite links in combination with a public switched telephone network system for distributing calls.

U.S. Pat. No. 5,708,679 teaches a satellite system that transmits to multiple remote terminals.

SUMMARY OF THE INVENTION

An integrated satellite/cell telecommunications system and equipment that provides low-cost telephony services to subscribers in remote/rural and other previously non-served areas utilizing single hop, full mesh interconnect and local routing of intra-cell calls is provided. Intra-cell, herein defined as communications between subscribers in the same network cell, is accomplished within a network wireless "cell" which can be wireless local loop or cellular. A subscriber earth terminal station also can act as a cell in the network, but contains only a single subscriber. As used herein a network earth terminal station is either a satellite earth terminal station or a subscriber earth terminal station depending upon the cell configuration. The network as used herein is meant to refer to a wireless telecommunication system including network cells communicatively interlinked through a non-processing satellite interconnect or backbone wherein all the components are controlled by a network management system through an open signaling channel. Inter-cell, herein defined as communications between subscribers in different cells in the network, is accomplished by a single hop traffic communication channel. Communication traffic within the network such as between cells, and between cells and the public switched telephone network is supported through existing, non-processing network satellites by means of network earth terminal stations at the remote network cell sites and is centrally managed by a network management and control function through an open signaling channel. Thus, the network management and control function assigns communication traffic channels by use an open signaling channel which can be carried by any media but is preferably carried by the non-processing satellite network.

In accordance with the broad aspect, the telecommunications system of the instant invention uses distributed call processing and flexible communication traffic routing interconnect through existing, non-processing satellites to create a cell extension system particularly for wireless local loop or cellular. The network comprises a satellite interconnect backbone, at least two network cells communicating with the backbone via network earth terminal stations and having cell management systems, and a network management control function. The cell management system includes a cell base station for processing and controlling inter-cell and intra-cell interconnects within the network and a wireless transceiver control function. The cell management system preferably includes a fully functioning wireless radio and control center. The network cell consists of a single subscriber linked through a subscriber earth station or a number of subscribers linked in a wireless system controlled by means of a cell management system through a satellite earth terminal station. The satellite interconnect backbone is a network of satellites which can support both an open signaling and data channel and a DAMA communication traffic band width.

The cell management system for the multi-subscriber cell preferably contains a radio base transceiver processing function, a base station control function, a call processing control function, a cell switching center function, and a cell location registry data base. This enables the cell management system to directly handle all local intra-cell calls between same cell subscribers as well as route non intra-cell calls (inter-cell calls) through the satellite interconnect backbone.

The network management system provides centralized overall network management and control, such that all DAMA communications through the satellite interconnect backbone are under the direction of the network management system. The network management system manages the allocation of DAMA traffic channels by means of an open signaling and data channel which continuously interconnects the network cells as well as the public switched telephone network through the satellite interconnect backbone. The network management system may be included with any network earth terminal station within the network, but is preferably located at a gateway site which integrates a public switched telephone network interconnect point.

The satellite interconnect backbone provides both open channel signaling and data access and DAMA traffic circuits and comprises the non-processing satellite system accessed by means of a network earth terminal station at a remote network cell site. Channel switching and DAMA communications traffic routing is performed by the centralized network management system as a function of frequency assignments provided to each cell. The network control terminal is the means by which each network earth terminal station communicates with the network management system via the open signaling and data channel.

In accordance with the invention, a satellite interconnect backbone is utilized to provide a full mesh, single hop, inter-cell network communications utilizing distributed switching wherein the traditional central switching function is, in part, distributed among the network cells to provide network cell autonomous switching. In accordance with one embodiment a single channel per carrier-demand assigned multiple access is utilized. In accordance with another embodiment a time division multiple access-demand assigned multiple access is utilized. Other demand assigned multiple access systems are also operable as long as single-hop, full mesh connectivity is provided.

In accordance with the invention, the network cell used as the cellular component of the overall network can be any cellular or cordless phone system containing at least two subscribers or a stand alone single subscriber earth terminal station. For example, cellular systems such as global system for mobile communications, code division multiple access, advanced mobile phone system, extended total access communications system or the like can be utilized. Likewise, cordless phone systems such as digital European cordless telephone, personal handyphone system or the like can be utilized. The preferred embodiment is single channel per carrier-demand assigned multiple access network with digital European cordless telephone as a wireless local loop cell.

The network earth terminal station that supports the traffic between a network cell and any other network earth terminal station can be any means for earth satellite data link such as single channel ultra-small aperture terminals, small aperture terminals, very small aperture terminals, and large earth terminals.

In accordance with the invention the network uses a distributed switching system coupled with a system that uses mesh, on-demand satellite links to interconnect network components such that the satellite is used as a "switch" for the routing of calls between network cells; or, between a network cell and a networked public switched telephone network. This system enables the routing of subscriber calls via a single hop to the destination subscriber irrespective of the subscriber location, so long as the subscriber unique address is accessible through the network location registry contained as a function of the network management system. The distributed switching system employs local switching at the cell site as part of the network switching to provide optimal call routing such that intra-cell calls are routed locally at the network cell without using any satellite bandwidth.

In accordance with a preferred embodiment, the network management system, which provides centralized overall system management and control, is located at a gateway site, which interfaces directly with the public switched telephone network. All satellite interconnect backbone communications traffic is routed under the direction of the network management system, but inter connect communication traffic is not routed through the network management system. Very importantly, the network management and control system provides interworking (protocol translation) between the network and public switched telephone network to match the local or national signaling standard.

In accordance with the invention, each network subscriber or a subscriber accessible through the network, in for example, a public switched telephone network is identified by a unique address. Network subscriber information for the entire network is contained in a network location register maintained within the network management system. This location register includes a public switched telephone network subscriber location within a specific public switched telephone network by for example, area code or the like. A network cell location register is maintained at each cell site to identify the subscribers in the cell. In this manner network intra cell switching can take place wholly within a network cell containing two or more subscribers.

In accordance with the invention, the central management and control function is responsible for interworking into the public switched telephone network. That is, provide interface with the national or local signaling standard, be it R1, R2 or signaling system number 7 (protocol translation). In this regard, there is also multiple levels of interworking within the system: (1) inter-working between the cell access e.g. wireless local loop access protocol and the satellite demand assigned multiple access protocol at the cell site, and (2) between the demand assigned multiple access protocol and the local signaling standard at the public switched telephone network. In case (1), the ability to interwork from the wireless access protocol directly to the DAMA satellite protocol provides a level of integration that enables a cost effective design.

In accordance with a preferred embodiment, each network cell management function consists of a call processing control function, cell switching control function, a base system control and a base station transceiver function. The call processing function maintains its own network cell location register and a cell visitor location register (for cellular cells) at each network cell site. The cell location register and cell visitor location register provides database information for all network subscribers within the network cell. Thus, each network cellsite contains a cell location register, (i.e. a database uniquely identifying all network subscribers serviced by and assigned to that network cell). In addition, the centralized network management system (which controls the switching aspect of the satellite) contains a network location register which is a database that uniquely defines all network subscribers as well as subscribers area code or the like that are accessible through a public switched telephone network.

In operation, for a call between two subscribers within a network cell (an intra cell call), the local cell switch function identifies both subscribers in its cell location register and subsequently configures the call without requiring access to the satellite. If the call is outside the cell, (inter cell call) this is identified by the fact that the destination subscriber is not in the network cell location register located in the initiating subscribers network cell, a call request is then made to the network management system, since the destination subscriber is not known by the cell site. The network management system checks the network location register database and determines if the destination subscriber is within another network cell, such that the call should be routed over the satellite between two network sites or cells within the network, or if the destination subscriber is outside the network cells in which case the call is routed for example, to the public switched telephone network by means of the destination subscriber's area code or the like. In accordance with the invention, when a destination subscriber is not found in a network cell, the system still uses dial-digit analysis to determine the optimum routing to the public switched telephone network. This is defined as routing the call to an appropriate gateway station based on area code or as predetermined by the destination subscriber's service provider.

In accordance with the method of the instant invention, when a call is placed within a given cell, if the destination subscriber is within the cell (as identified by the cell location register), the call is handled entirely within the cell. If the destination subscriber is not found in the cell location register, a DAMA traffic circuit is configured to support the communication while the cell management system queries the network location register through the open signaling and data channel for the location of the destination subscriber. A satellite link, wire line link, or the like, is then configured to complete the communication traffic link from the initiating subscriber to the destination subscriber.

DESCRIPTION OF THE PREFERRED EMBODIMENTS

A distributed system for application to sparsely populated areas without infrastructure that provides distributed call processing and a flexible call routing satellite interconnect "backbone" to create a remote site cell extension system is provided. By using the satellite as a switching center for communication traffic routing between "cells", cells may be placed anywhere and operate autonomously. Because of the functionality that is provided at the cell site (local call control and switching capability), the mobile switching center and base station controller functions found in prior art remote systems are distributed across the entire network. Thus, for an intra cell call, the local switch function identifies both initiating subscriber and destination subscriber in the cell location register and subsequently configures the call locally. No satellite access is necessary.

If the call designates a destination subscriber outside the cell, identified by the fact that the destination subscriber is not in the cell location register located in the initiating subscribers network cell, a call request is made to the network management system through the open signaling and data channel of satellite interconnect backbone since the destination is not known by the network cellsite. The network management system checks its network location register database and determines if the destination subscriber is within a network cell, such that the call should be routed over the satellite between two cells within the network, or if the destination subscriber is located outside the network in which case the call is routed to the public switched telephone network or a gateway having subscribers outside the network. In the event that the destination subscriber is not in the network i.e. the subscribers unique address is not found in the network location register, the system still uses dial-digit analysis to determine the optimum routing to the public switched telephone network. The call is routed to the gateway station for the appropriate public switched network based on area code or as predetermined by the service provider.

Figure 1:
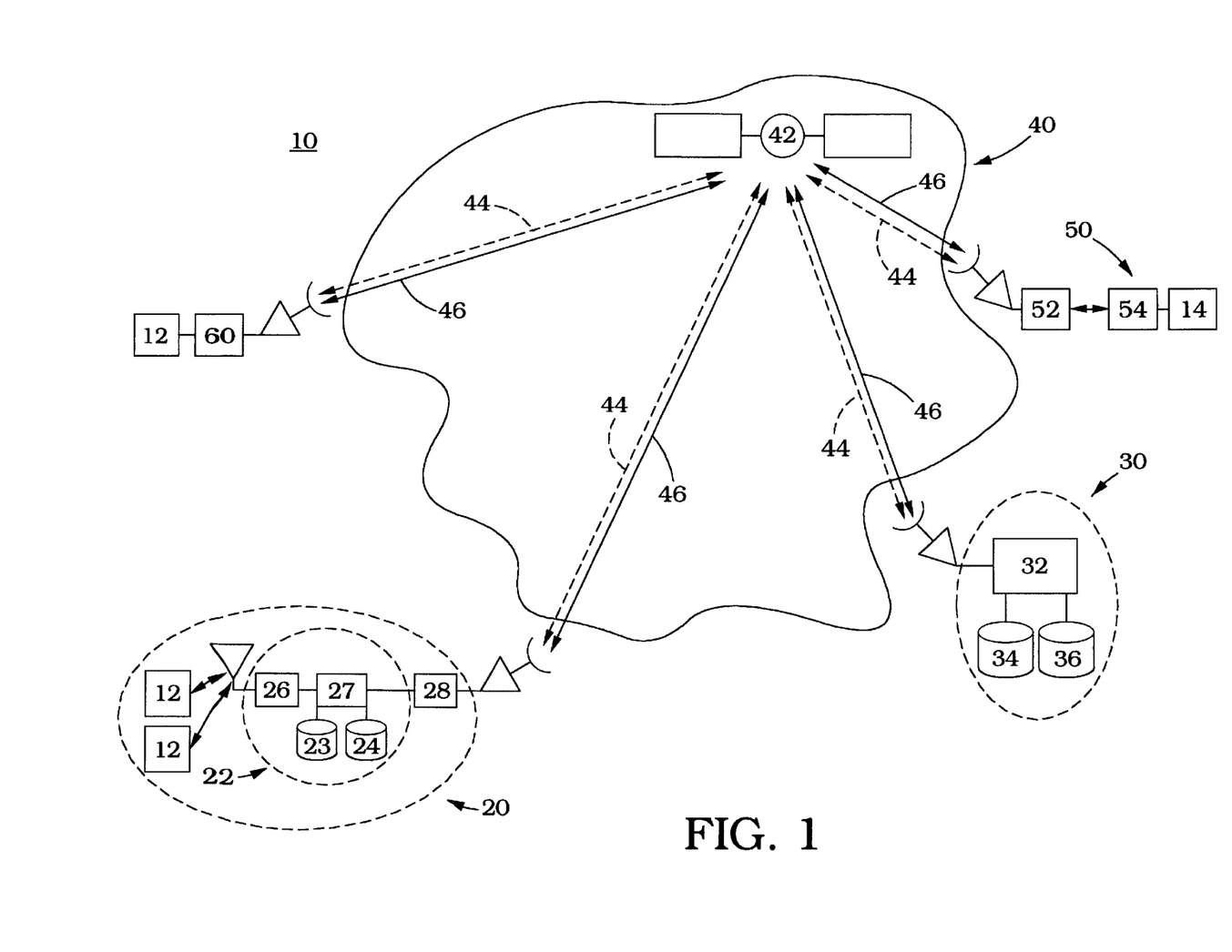
FIG. 1 is a schematic view of a network configuration in accordance with the invention.

Turning specifically to the drawings wherein like elements bear like reference numerals there is shown in FIG. 1, the integrated satellite/cell network system 10 of the instant invention wherein intra cell communications are accomplished by routing calls within the cell and inter cell communications are accomplished by routing calls between cells and/or the public switched telephone network. The integrated satellite/cell network system 10 is comprised of one or more network subscribers 12 and/or public telephone switching network subscribers 14 interconnected in a distributed network containing at least one cell 20, a network management system 30 and a satellite interconnect backbone 40. The network can also contain a subscriber network earth terminal station 60 and a gateway interconnect for access to a public switched telephone network 50. The elements of the integrated satellite/cell network system 10 interconnect by means of an open signaling and data channel 44 and DAMA communication assigned channels 46 over the satellite interconnect backbone 40 as assigned by the network management system 30.

The network cell 20 contains at least two subscribers 12, a cell management system 22 and a satellite network earth terminal station 28. The cell 20 can be a cordless phone system or it can be cellular. A cordless phone system may be selected from a group consisting of digital European cordless telephones, personal handyphone systems or any combination thereof. A cellular cell may be a global system for mobile communications, code division multiple access, advanced mobile phone system, extended total access communications system or any combination thereof.

The cell management system 22 located in cell 20 employs localized switching at the cell site such that intracell calls are routed locally without using any satellite bandwidth. The cell management system 22 has a base station controller/base transceiver 26 for wireless communications interface with subscribers 12 and a cell switching center 27 inter connected to the network cell home location register 23, and in the case of a cellular cell, which provides roaming capability, a cell visitor location register 24. The base station controller/base transceiver 26 can be any apparatus, known in the art, for managing the radio resources within the network cell. This includes the ability to allocate and control traffic channels, undertake handovers and provide radio performance measurements. The cell switching center 27 communicates with the controller/base transceiver 26 to provide switching and cell interworking protocol. Cell switching center 27 interfaces with the network for inter-cell network communication and provides cell autonomous intra-cell connection at the cell management system 22 without using any satellite bandwidth by accessing the cell home location register 23 and cell visitor location register 24 which provide database information for all subscribers and visitors within cell 20.

The satellite earth terminal station 28, located in cell 20, communicates with switching center 27 and provides full digital interface between the cell 20 and the other elements of the integrated satellite/cell network system 10. The satellite earth terminal station 28 may be selected from a group consisting of a single channel ultra-small aperture terminals, small aperture terminals, very small aperture terminals and large earth terminal.

A subscriber earth terminal station 60 is a single subscriber cell within the network and is comprised of a local switching function/ single subscriber registry usually hard wired to a subscriber unit 12 for direct interconnect with the network management system 30 via the open signaling and data channel 44 and to the elements of the integrated satellite/cell network system 10 via DAMA communication assigned channels 46 through the satellite backbone 40. All incoming and outgoing communications from station 60 involve a satellite hop.

The public switched telephone network satellite earth terminal station 50 has a gateway 52 that directly interfaces with the public switched telephone network 54 having a plurality of subscribers 14 accessible to subscribers 12 by way of the integrated satellite/cell network system 10. The public switched telephone network satellite earth terminal station 50 communicates with the network management system 30 via the open signaling and data channel 44 and to the elements of the integrated satellite/cell network system 10 via DAMA communication assigned channels 46 through the satellite backbone 40.

The satellite interconnect backbone 40 is comprised of a demand assigned multiple access, non processing, full mesh satellite system for facilitating the link among the elements of the integrated satellite/cell network system 10 via the open signaling and data channel 44 and the communication among the elements of the integrated satellite/cell network system 10 via DAMA communication assigned channels 46. The satellite interconnect backbone 40 consists of one or more satellites 42, open signaling and data channel 44 and DAMA traffic circuit 46. The open signaling and data channel 44 is a common signaling channel for all cells 20, public switched telephone network satellite earth terminal stations 50 and subscriber earth terminal stations 60 to communicate with the network management system 30 for DAMA requests/assignments and overall management and control of integrated satellite/cell network system 10. DAMA traffic circuits 46 are set-up between any two network earth terminal stations to carry the actual voice/fax/data for the duration of the respective interconnect.

The network management system 30 is the controlling element of the network 10 and provides centralized overall network management and control, assignment of channels, and data update to network elements. It is preferably located at a gateway, but is shown in FIG. 1 as a stand alone unit. The network management system 30 controls the access to, from and among elements in the network. The network control terminal 32, located in the network management system 30, is a mechanism by which network cells 20, public switched telephone network satellite earth terminal stations 50 and subscriber earth terminal stations 60 communicate with the network management system 30 via the open signaling and data channel 44. The network management system 30 also has a network home location register 34 and a network visitor location register 36 that provides database information for all subscribers in the network as well as gateway access to the public switched telephone network.

Figure 2:
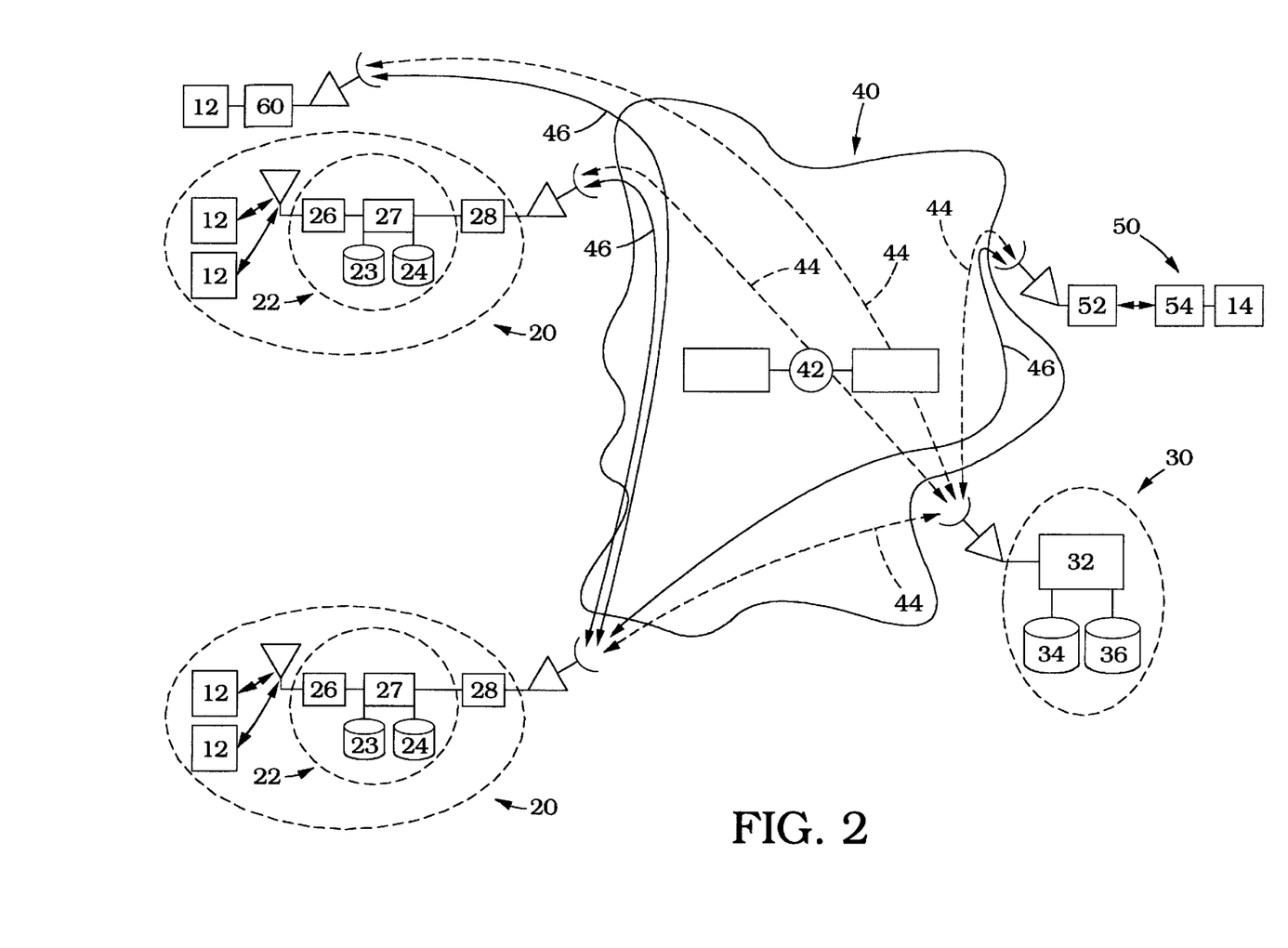
FIG. 2 is a schematic view of the information flow model for exchange of data/information in accordance with the system of the instant invention.

Turning to FIG. 2 there is depicted an information flow schemata in accordance with the instant invention for exchange of data/information.

Call Routing Between an Initiating Network Cell Subscriber and a Network Cell Destination Subscriber within the Same Cell (Intra-cell)

The initiating cell subscriber 12 interconnects with the system and enters the destination subscriber's 12 unique identification address. The network cell home location register 23 and cell visitor location register 24 located in the initiating subscriber's cell management system 22 identifies the destination subscriber 12 as being a subscriber in the same cell 20 as the initiating subscriber 12. The cell switching center 27 locally switches the call to the base station controller/base transceiver 26. The base station controller/base transceiver 26 sends a paging message to the destination cell subscriber 12 and connects the call.

Call Routing Between an Initiating Network Cell Subscriber and a Destination Network Cell Subscriber Located in a Different Network Cell (Inter-cell)

The initiating network cell subscriber 12 interconnects with the system and enters the destination network cell subscriber's 12 unique identification address. The network cell home location register 23 and cell visitor location register 24 located in the initiating network cell subscriber's 12 network cell management system 22 identifies the network cell destination subscriber 12 as being outside of the network cell initiating subscriber's cell 20. A call request is generated by cell switching center 27 and the satellite earth terminal station 28 located at the initiating subscriber's cell 20 sends it to the network management system 30 via the open signaling and data channel 44.

The network management system 30 containing the network control terminal 32, determines if the destination subscriber 12 is a network cell destination subscriber by means of the network home location register 34 and the network visitor location register 36. If the destination subscriber 12 is part of the network, DAMA call set-up information is transmitted by the network management system 30 to the initiating subscriber's cell 20 and to the destination subscriber's cell 20 via the open signaling and data channel 44. Satellite earth terminal station 28 located at the initiating subscriber's cell 20 and the satellite earth terminal station 28 located at the destination subscriber's cell 20 receive the DAMA call set-up information. This information enables a DAMA traffic circuit 46 to be set up between the two respective satellite earth terminal stations 28 and allows proper routing of the call within the destination subscriber's 12 cell management system 22.

Once the DAMA traffic circuit 46 is operating between the initiating subscribers satellite earth terminal station 28 and the destination subscriber's satellite earth terminal station 28, the base station control/base transceiver 26 sends a paging message to the destination subscriber 12 and connects the call.

Call Routing Between an Initiating Network Cell Subscriber and a Destination Subscriber Earth Terminal Station The initiating network cell subscriber 12 places a call to a destination subscriber 12 located at a subscriber earth terminal station 60, interconnects with the system and enters the destination subscribers 12 unique identification address. The network cell home location register 23 and cell visitor location register 24 located in the initiating subscriber's cell management system 22 identifies the destination subscriber 12, as being outside of the initiating subscribers cell 20. A call request is generated and sent by the initiating subscriber cell's satellite earth terminal station 28 to the network management system 30 via the open signaling and data channel 44.

The network management system 30 contains the network control terminal 32, the network location register 34 and network visitor location register 36. The network home location register 34 and the network visitor location register 36 determines if the subscriber earth terminal station 60, is part of the network. The DAMA call set-up information is transmitted by network management system 30 to the initiating subscriber's satellite earth terminal station 28 and to the subscriber earth terminal station 60, via the open signaling and data channel 44.

The satellite earth terminal station 28 located at the initiating network cell subscriber's cell 20 and the subscriber earth terminal station 60, receives the DAMA call set-up information from the network management system 30. This information enables a DAMA traffic circuit 46 to be set up between the initiating subscriber's satellite earth terminal station 28 and the subscriber earth terminal station 60.

Once DAMA traffic circuit 46 is operating between the initiating subscriber's satellite earth terminal station 28 and the subscriber earth terminal station 60, the call is connected.

Call Routing from a Network Subscriber Earth Terminal Station to a Network Cell The initiating subscriber 12 places a call from a subscriber earth terminal station 60, interconnects with the system and enters the destination subscriber's 12 unique identification address. A call request is generated and sent by the subscriber earth terminal station 60, to the network management system 30 via the open signaling and data channel 44.

The network location register 34 and network visitor location register 36, located at the network management system 30, determines if the destination subscriber 12 is part of the network. If the destination subscriber 12 is part of the network, the DAMA call set-up information is transmitted by the network management system 30 to the subscriber earth terminal station 60 and to the destination network cell subscriber's satellite earth terminal station 28 via the open signaling and data channel 44.

The subscriber earth terminal station 60, and the destination subscriber's satellite earth terminal station 28 receive the DAMA call set-up information from the network management system 30. This information enables a DAMA traffic circuit 46 to be set up between the subscriber earth terminal station 28 and the destination network cell subscriber's satellite earth terminal station 28 and allows proper routing of the call within the destination subscribers cell management system 22.

Once the DAMA traffic circuit 46 is operating between the subscriber earth terminal 60 and the destination network cell subscribers 12 satellite earth terminal station 28, the base station control/base transceiver 26 sends a paging message to the network cell destination subscriber 12 and connects the call.

Call Routing from a Network Cell Subscriber to the Public Switched Telephone Network The initiating network cell subscriber 12 places a call to the destination subscriber 14 located in the public switched telephone network 54, interconnects with the system and enters the destination subscribers 14 unique identification address. The cell home location register 23 and cell visitor location register 24 located in the initiating network cell subscribers cell management system 22 identifies the destination subscriber 14 as being outside of the initiating subscribers cell 20. A call request is generated and sent by the initiating subscriber cell's satellite earth terminal station 28 to the network management system 30 via the open signaling and data channel 44.

The network home location register 34 and network visitor location register 36 in the network management system 30 determines that the call is not to a subscriber in the network and determines that the call should be routed to gateway 52. The DAMA call set-up information is sent via the open signaling and data channel 44 from the network management system 30 to the initiating subscribers satellite earth terminal station 28 and gateway 52. Gateway 52 is the public switched telephone network 54 entry point for proper routing of the call to the destination subscriber 14 located at the public switched telephone network 54.

This information enables a DAMA traffic circuit 46 to be set up between the initiating network cell subscriber's 12 satellite earth terminal station 28 and the gateway 52. Once the DAMA traffic circuit 46 is operating between the initiating subscribers satellite earth terminal station 28 and the gateway 52, the call is routed to the public switched telephone network 54, and the call is connected.

Call Routing from the Public Switched Telephone Network to a Network Subscriber The initiating subscriber 14 located in the public switched telephone network 54 places a call to the network destination subscriber 12 by interconnecting with the system and entering the network destination subscriber's 12 unique identification address. Gateway 52, which is the public switched telephone network 54 entry point, generates a call request and transmits it to the network management system 30 via the open signaling and data channel 44.

The network location register 34 and network visitor location register 36 in the network management system 30 determine that the destination subscriber 12 is part of the network. If the destination subscriber 12 is part of the network, the DAMA call set-up information is sent from the network management system 30 to gateway 52 and the destination subscriber's 12 satellite earth terminal station 28 or subscriber earth terminal station 60 via the open signaling and data channel 44.

The gateway 52 and the destination subscriber's satellite earth terminal station 28 or subscriber earth terminal station 60 receive this DAMA call set-up from the network management system 30. This information enables a DAMA traffic circuit 46 to be set up between the gateway 52 and the destination subscriber's satellite earth terminal station 28 or subscriber earth terminal station 60 and if necessary allows proper routing of the call within this destination subscriber cell management system 22.

Once the DAMA traffic circuit 46 is operating between the gateway 52 and the destination subscriber's satellite earth terminal station 28 or subscriber earth terminal station 60, if necessary, the base station control/base transceiver 26 sends a paging message to the network destination subscriber 12 and connects the call.

Figure 3:
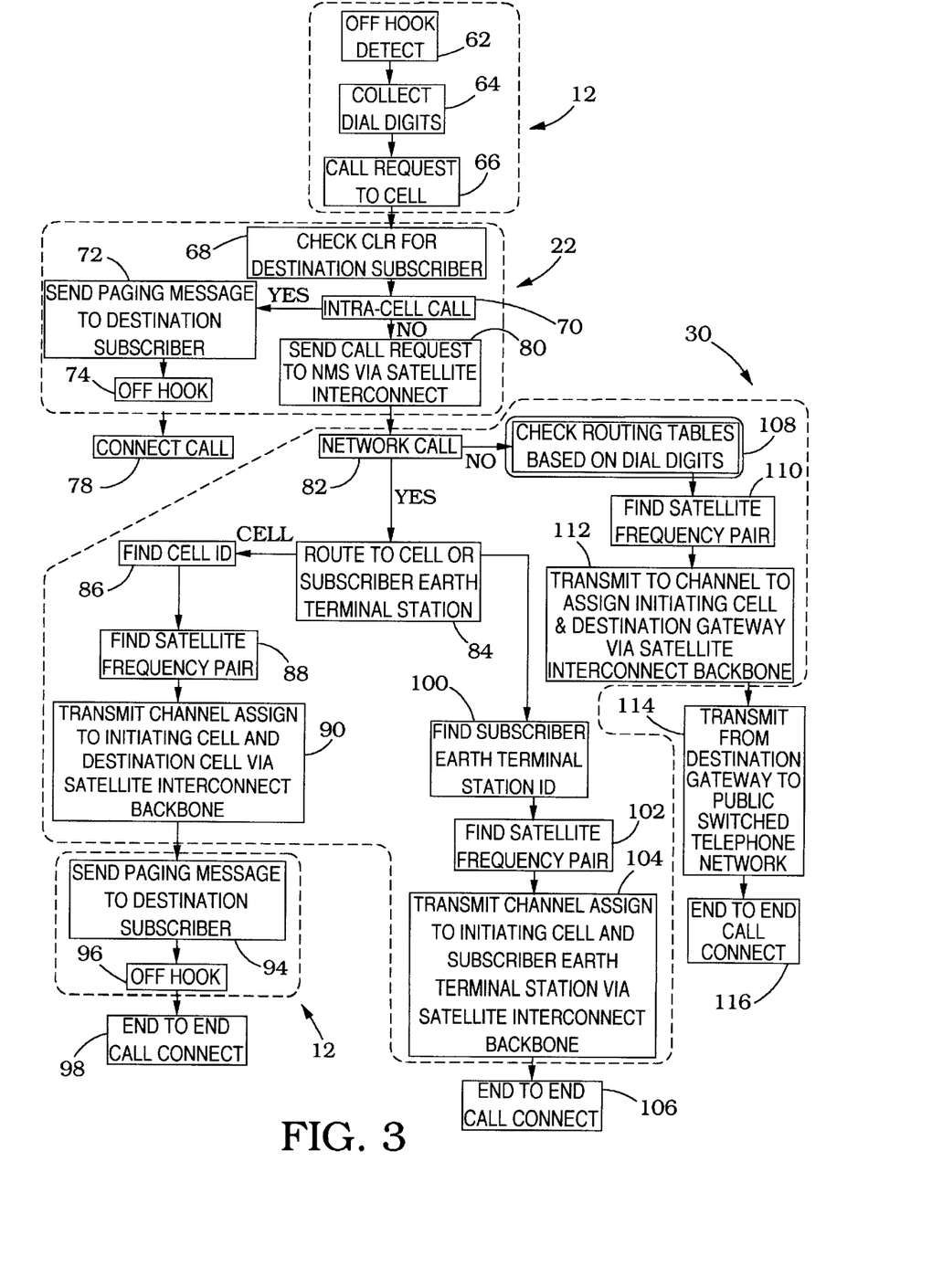
FIG. 3 is a flow chart showing the network information processing and transfer in accordance with the instant invention.

Turning to FIG. 3, there is shown an information flow diagram of one aspect of the invention showing a call being routed through the system of the instant invention where the initiating subscriber is a network cell subscriber 12. As shown in FIG. 3, the system is comprised of subscribers 12, a cell management system 22 and a network management system 30. The diagram in FIG. 3 represents the execution steps in routing a call between an initiating subscriber 12 to a destination subscriber 12 or 14 (not shown).

The initiating subscriber 12 interconnects with the system causing an off hook detect 62. The initiating subscriber 12 enters the destination subscriber's unique identification address by dialing the appropriate digits. The address dialing digits are then collected 64 and a call request is generated to the cell 66. The cell management system 22 then checks the cell location register for the destination subscriber 68 and determines at 70 if it is an intra cell call. If the call is intra cell, a paging message 72 is sent to the destination subscriber. There is an off hook detect 74 and the intra cell call is then connected 78 to network cell destination subscriber 12 (not shown).

If the cell location register determination 68 indicates via 70 that the destination subscriber 12 is not located in the same cell as the initiating subscriber 12, a call request is sent to the network management system 30 via the satellite interconnect 80. The network management system 30 determines if the destination subscriber is in the network 82 by means of network location regestry. If the destination subscriber 12 is in the network registry, the call will be routed to either a cell or a subscriber earth terminal by means of 84. If the destination subscriber is located in a cell, the network management system finds the destination subscriber's cell identification number at 86 and the satellite frequency pair 88. Thereafter, the destination subscriber's cell identification number and the satellite frequency pair is transmitted from the network management system 30 through the open signaling and data channel to the initiating subscriber's network cell management system and the destination subscribers network cell management system at 90. This notifies the destination subscriber network cell management system that a call is going to be transmitted to it from the initiating subscriber's network cell management system. It also tells the initiating subscriber's cell management system 22 where to route the call.

Once the call is transmitted from the initiating subscriber's cell management system to the destination subscribers cell management system, a paging message is sent by the destination subscriber's cell management system to the destination subscriber at 94. There is an off hook detect at 96 and the call is then connected at 98 to destination network cell subscriber 12.

If the destination subscriber is located in a subscriber earth terminal station, the network management system finds the subscriber earth terminal station identification number at 100 and the satellite frequency pair 102. Thereafter, the subscriber earth terminal station identification number and the satellite frequency pair is transmitted from the network management system to the initiating subscribers cell management system and to the subscriber earth terminal station via the satellite interconnect backbone at 104. This notifies the subscriber earth terminal station that a call is going to be transmitted to it from the initiating subscribers cell management system and tells the initiating subscriber's cell management system where to route the call.

The call is thereafter transmitted from the initiating subscribers cell management system to the subscriber earth terminal station, where the destination subscriber is located, and the call is then connected at 106 with subscriber earth station subscriber 12 (not shown).

If the network management system 30 determines that the destination subscriber is not in the network at 82, the network management system checks the routing tables based on the dial digits at 108 and finds the satellite frequency pair 110. The network management system digitalizes or packages the routing and satellite frequency information and transmits it to the initiating subscribers cell management system and the destination subscriber's gateway via the satellite interconnect backbone 112. This notifies the destination subscriber's gateway that a call is going to be transmitted to it from the initiating subscriber's cell management system and tells the initiating subscriber's cell management system where the call needs to be routed. The call is thereafter transmitted from the initiating subscribers network cell management system to the destination subscriber's gateway where it is transmitted to the public switched telephone network 114. The call is then connected at 116 to public switched telephone network subscriber 14 (not shown).

The Satellite Interconnect Backbone

In accordance with the invention, the satellite interconnect backbone consists of 1) the open signaling and data channel or common signaling channel for overall network control and 2) the actual DAMA traffic circuits that are only active for the duration of any given voice/fax/data call. The system satellite interconnect backbone operates as a demand assigned multiple access system with full mesh capability. Thus, network calls between network cell sites or the public telephone switching system interconnect are directly interconnected on demand while requiring only a single satellite hop to minimize delay. Distributed switching/control is provided, such that optimal call routing is performed for all calls, to minimize satellite bandwidth (and hence network operation costs).

The open satellite and data channel or common signaling channel consists of virtual links among every network earth terminal station or gateway and the network management system. These virtual links are used for DAMA call requests from a network earth terminal station and corresponding DAMA channel assignments are made. In addition to servicing the DAMA call transactions, this open signaling and data channel is also used to communicate cell or network subscriber information and other related cell monitor and control data to/from the network management system.

Once call requests are processed by the network management system, DAMA traffic circuits are assigned between the earth terminals or gateways to transmit/receive their voice/fax/data/traffic via a single hop direct satellite link for the duration of the call. Upon call conclusion, the DAMA traffic circuit is released and returned to the DAMA pool for use by the network.

A set of forward and reverse order wire channels are used as the satellite signaling channels between a group of network earth terminal stations/gateways and the network management system. A packet based format is utilized to transmit/receive the above information via the open signaling and control channel. The reverse order wire channel (inbound channel from network earth terminal station/ gateway to network management system) is preferably operated with call requests and control data transmitted as time division multiple access bursts to the network management system.

The forward order wire channels (outbound channel from network management system) is operated as a continuous time division multiplex channel for transmission of channel assignments and control data. For large networks, multiple signaling channels can be supported. All earth terminal/ gateways have unique ID's used for packet addressing by the system. Thus, a multitude of earth terminal/gateways can share a common signaling channel.

Cell Management System

The cell management system structure consists of a base transceiver control system and a cell switching center for integration through the satellite earth terminal stations for intra-cell and inter-cell transmissions. It is located at the network cell site. For purposes herein, a cell management system applies to typical cells that support cellular or wireless local loop networks and include a base station controller/base transceiver. The base station controller is responsible for the management of the radio resources within the region. This could be one or more base transceiver systems and includes the ability to allocate and control traffic channels, undertake handovers and provide radio performance measurements. Each base transceiver provides layers 1 and 2 protocol processing of the radio interface. Inclusion of the switching and control functionality enables the network cell site to autonomously handle local calls so back hauling data to a central switch is not required. Thus, each network cell site contains switching capability along with a cell location register to be used for call control. If the destination subscriber is assigned to the cell, as identified by the cell location register database, the call is switched and connected locally without interaction with the network management system or the satellite backbone system. At the conclusion of the call, the record for that local call is sent to the network management system via the open signaling and data channel.

For inter-cell calls, the network initiating subscriber's cell identifies the call as having a destination subscriber outside the cell. This information is routed in packet form to the network management system over the open signaling and data channel. The network management system selects a pair of frequencies from the bandwidth pool and transmits the assignment over the outbound control channel to the destination subscriber's cell. The two sites configure the traffic equipment to the appropriate frequency and connect the call. At call conclusion, the network management system is again informed of the call conclusion and the detail record information for that call is transmitted to the network management system. The network management system then returns the frequency pair to the bandwidth pool and updates its call detail record database.

A local computer (microprocessor) for example can provide cell call processing and cell management system operations, monitoring and control functions. This processor provides call processing, subscriber management, local call detail records processing, and operations/maintenance control functions. It also maintains a database of all valid cell subscribers as well as any visitors to the cell, if applicable. The processor communicates directly with the network earth terminal station with all messages directly inter worked between the cell protocol and the DAMA protocol. This feature enables the two diverse systems (cell, satellite) to be completely interfaced and integrated with no intermediate protocol translation.

The cell home location register and cell visitor location register databases include all applicable cell subscriber ID's and those key variables necessary for call setup and authentication. Authentication is performed as a distributed function with processing divided between the network management system and cell site so that cell subscribers authentication can be handled in real-time at the cell site, without the need of the satellite network or the network management system.

Variables are globally maintained by the network management system and passed to the cell site base station in anticipation of subscriber authentication processes. At call setup the appropriate set of authentication variables are extracted from the cell home location register and visitor location register databases and are used to validate the call.
System Gateway The equipment at the gateway sites is responsible for inter working into the public switched telephone network. Each gateway consists of a set of satellite earth terminal station equipment that can simultaneously transmit/receive N voice channels. N voice channels are independent from gateway to gateway. In accordance with the instant invention, gateways can be optimally sized to handle the expected traffic load at their specific access point into the public switched telephone network. In addition, the gateway must interface with the national or local signaling standard be it R1, R2, Signaling System Number 7 or the like via an interworking function between the demand assigned multiple access protocol and the selected signaling standard.
Network Management System Preferably, there is a single centralized network management center that is responsible for the management of both the demand assigned multiple access satellite and open signaling and data channel. This single management entity performs the monitoring, controlling and management functions for all network components. and open signaling and data channel. This single management entity performs the monitoring, controlling and management functions for all network components. Management and control information to/from each component, which includes subscriber database downloads, call detail records for intra-cell calls, fault reporting data and quality of service information is communicated to the network management system via the open signaling and data channel. Preferably, a network cell satellite earth terminal station provides full digital interface between the cell and the satellite. Interworking at both software and hardware level is performed as part of the cell site. The open satellite signaling and data channel is used to provide remote subscriber management, software downloads, and the like to the cell site from the network management system.

What is claimed is:

1. An integrated satellite/cell telecommunication network for communication among subscriber units comprising:
   a.) at least one communication satellite interconnect backbone system comprising a demand assigned multiple access, non processing, full mesh satellite network adapted to communicate with at least one earth terminal/gateway station;
   b.) a network management system having an earth terminal/gateway station and containing a network location register for subscriber units within the network for
      1.) controlling said network;
      2.) routing said communication traffic to, from and among network cells; and,
      3.) facilitating single hop, non-intra cell communication of subscriber units by means of said communication satellite interconnect backbone system; and,
   c.) at least one network cell containing at least one network subscriber unit having an earth terminal/ gateway station and, a cell management system containing a cell location register for subscriber units within the cell, for
      1.) controlling said cell;
      2.) routing intra-cell communication traffic to, from and among cell subscribers; and,
      3.) facilitating single hop, non-intra cell communication of subscriber units by means of said communication satellite interconnect backbone system.

2. The system as set out in claim 1 wherein said routing established by use of a network management system is accomplished by use of an open signaling channel born by said communication satellite interconnect backbone system.

3. The system as set out in claim 1 wherein said cell management system has demand assigned multiple access functionality.

4. The system as set out in claim 1, wherein said cell is a selected from a cellular or cordless phone system.

5. The system as set out in claim 4, wherein said cellular system is selected from the group consisting of a global system for mobile communications, code division multiple access, advanced mobile phone system, extended total access communications system and combinations thereof.

6. The system as set out in claim 4, wherein said cordless phone systems is selected from the group consisting of digital European cordless telephone, personal handyphone system and combinations thereof.

7. The system as set out in claim 1, wherein said cell is a subscriber earth terminal station having one subscriber unit.

8. The system as set out in claim 1, wherein said cell location register of subscriber units within the cell comprises a cell home location register of cell subscribers and a cell visitor location register of cell visitors.

9. The system as set out in claim 1, wherein said network location register of subscriber units within the network comprises a network home location register of network subscribers and a network visitor location register of network visitors.

10. The system as set out in claim 1, wherein said cell management system further includes the intra-cell call processing function and inter-cell switching capability integrated with the earth terminal/gateway station.

11. The system as set out in claim 10, wherein said cell management system further comprises a radio base transceiver processing function, base station control function, call processing control function, local switching function, and cell location registry function.

12. The system as set out in claim 10, wherein said cell management system provides protocol between said network cell subscriber units and said communication satellite interconnect backbone system.

13. The system as set out in claim 11, wherein said base transceiver processing function provides layers 1 and 2 of the radio interface.

14. The system as set out in claim 1, wherein said network management system is combined with a gateway.

15. The system as set out in claim 1, wherein said earth terminal/gateway station is selected from the group consisting of single channel ultra-small aperture terminals, small aperture terminals, very small aperture terminals, and large earth terminals.

16. The system as set out in claim 15, wherein said single channel ultra-small aperture terminals is selected from the group consisting of a subscriber earth terminal station and a free standing public phone earth station.

17. The system as set out in claim 15, wherein said very small aperture terminal is located at a cell site.

18. The system as set out in claim 15, wherein said large sized earth terminal stations are utilized for non-network gateway connections to the public switched telephone network.

19. The system as set out in claim 1 wherein said network management system provides protocol between said network cell subscriber units and said public switched telephone network.

20. An integrated satellite/subscriber telecommunication system for communication among subscriber units wherein intra cell communications is accomplished by routing within the cell and inter cell communication between cells and/or the public switched telephone network and/or subscriber earth terminal stations within the network or outside the network is accomplished by routing communications traffic over a single hop interconnect through non-processing satellites by means of earth terminal/gateway stations wherein such routing is established by use of a network management system comprising:
 a.) at least one communication satellite interconnect backbone system comprising a demand assigned multiple access, non processing, full mesh satellite network;
 b.) at least one cell, containing a cell management system having a cell location register of subscriber units within the cell for facilitating autonomous connecting of intra cell communication between subscriber units within said cell interactive with a network earth terminal station, and;
 c.) at least one network interactive with a network earth terminal station, containing a network management system for controlling said network and routing said communication traffic to, from and among subscriber units and having a network location register for subscriber units within the network for facilitating single hop, non-intra cell communication for subscriber units by means of said communication satellite interconnect backbone system.

21. The system as set out in claim 20 wherein said routing established by use of a network management system is accomplished by use of a communication satellite interconnect backbone system born open signaling channel.

22. The system as set out in claim 20 wherein said functional cell management system has demand assigned multiple access functionality.

23. The system as set out in claim 20, wherein said cell is selected from a cellular or cordless phone system.

24. The system as set out in claim 23, wherein said cell is cellular.

25. The system as set out in claim 24, wherein said cellular cell is selected from the group consisting of a global system for mobile communications, code division multiple access, advanced mobile phone system, extended total access communications system and combinations thereof.

26. The system as set out in claim 23, wherein said cell is a cordless phone system.

27. The system as set out in claim 26, wherein said cordless phone systems is selected from the group consisting of digital European cordless telephone, personal handyphone system and combinations thereof.

28. The system as set out in claim 20, wherein said cell location register of subscriber units within the cell comprises a cell location register of cell subscribers and a cell visitor location register of cell visitors.

29. The system as set out in claim 20, wherein said network location register of subscriber units within the network comprises a network location register of network subscribers and a network visitor location register of network visitors.

30. The system as set out in claim 20, wherein said cell management system further includes the cell management system function, a call processing function and switching capability integrated with the satellite earth terminal station.

31. The system as set out in claim 20, wherein said cell management system further comprises radio base transceiver processing, base station control, call processing switching, and cell location registry.

32. The system as set out in claim 30, wherein said cell management system provides protocol between said network cell subscriber units and said communication satellite interconnect backbone system.

33. The system as set out in claim 31, wherein said base transceiver processing provides layers 1 and 2 of the radio interface.

34. The system as set out in claim 20, wherein said network management system contains a functional network management system.

35. The system as set out in claim 34, wherein said functional network management system is a digital European cordless telephone cell network management system.

36. The system as set out in claim 20, wherein said network management system is combined with a gateway.

37. The system as set out in claim 20, wherein said satellite earth terminal station is selected from the group consisting of single channel ultra-small aperture terminals, small aperture terminals, very small aperture terminals, and large earth terminals.

38. The system as set out in claim 37, wherein said single channel ultra-small aperture terminals is selected from the group consisting of a subscriber earth terminal station and a free standing public phone earth station.

39. The system as set out in claim 37, wherein said very small aperture terminal is located at a cell site.

40. The system as set out in claim 37, wherein said large sized earth terminal stations are utilized for non-network gateway connections to the public switched telephone network.

41. The system as set out in claim 20, wherein said network management system provides protocol between said network cell subscriber units and said public switched telephone network.

42. A method for establishing communications between subscriber units using distributed call processing and flexible call routing interconnect network by means of network earth terminal stations and a full mesh, non-processing satellite interconnect backbone system wherein said network is controlled by a network management system containing a network location register and has at least one network cell with a cell management system containing a cell location register and having at least one subscriber comprising the steps of:

- a.) requesting a communication connection from an initiating subscriber unit having a unique identifier by entering the destination subscriber unit unique identifier into said system;
- b.) managing said network cell such that if the initiating subscriber unit identifier and the destination subscriber unit identifier are in the network cell location register the connection is made intra cell;
- c.) managing said network cell such that if the initiating subscriber unit identifier and the destination subscriber unit identifier are not in the network cell location register the management function is transferred by means of said satellite interconnect backbone to said network management system;
- d.) managing said network such that if the initiating subscriber unit identifier and the destination subscriber unit identifier are in said network location register the connection is made via said satellite interconnect backbone inter cell;
- e.) managing said network such that if the initiating subscriber unit identifier and the destination subscriber unit identifier are not in said network location register the connection is made through said satellite interconnect backbone between one of a network cell and the public switched telephone network, and the public switched telephone network and a network cell, a public switched telephone network and another in the public switched telephone network.

43. The method as set out in claim 42, wherein said routing is accomplished via the satellite interconnect backbone system by use of an open signaling channel.

44. The method as set out in claim 42, wherein said cell management system has demand assigned multiple access functionality.

45. The method as set out in claim 42, wherein said cell manager provides protocol between said network cell subscriber units and said communication satellite interconnect backbone system.

46. The method as set out in claim 42, wherein said cell is a selected from a cellular or cordless phone system.

47. The method as set out in claim 46, wherein said cellular system is selected from the group consisting of a global system for mobile communications, code division multiple access, advanced mobile phone system, extended total access communications system and combinations thereof.

48. The method as set out in claim 46, wherein said cordless phone systems is selected from the group consisting of digital European cordless telephone, personal handyphone system and combinations thereof.

49. The method as set out in claim 46, wherein said cell is a subscriber earth terminal station having one subscriber unit.

50. The method as set out in claim 46, wherein said cell location register comprises a cell home location register and a cell visitor location register of cell visitors.

51. The method as set out in claim 42, wherein said network location register of subscriber units within the network comprises a network location register of network subscribers and a network visitor location register of network visitors.

52. The method as set out in claim 42, wherein said earth terminal station is selected from the group consisting of single channel ultra-small aperture terminals, small aperture terminals, very small aperture terminals, and large earth terminals.

53. The system as set out in claim 52, wherein said single channel ultra-small aperture terminals is selected from the group consisting of a subscriber earth terminal station and a free standing public phone earth station.

54. The method as set out in claim 52, wherein said very small aperture terminal is located at a cell site.

55. The method as set out in claim 52, wherein said large sized earth terminal stations are utilized for non-network gateway connections to the public switching telephone network.

56. The method as set out in claim 42, wherein said network management system provides protocol between said network cell subscriber units and said public switched telephone network.

\* \* \* \* \*